No. 12,243. REISSUED JULY 19, 1904.
E. D. PRIEST.
MEANS FOR INSULATING ELECTRICAL APPARATUS.
APPLICATION FILED FEB. 20, 1903.
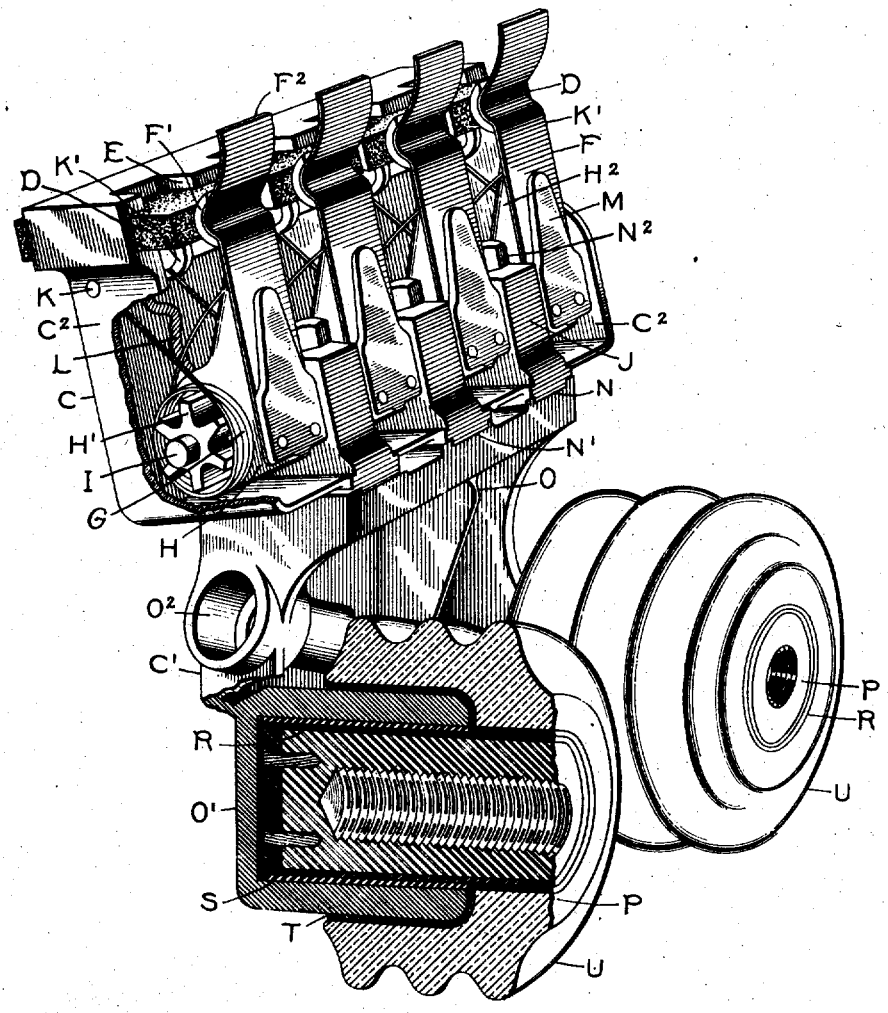
Witnesses.
George H. Tilden.
Helen Orford
Inventor.
Edward D. Priest.
by Albert G. Davis
Att'y.

No. 12,243. Reissued July 19, 1904.

UNITED STATES PATENT OFFICE.

EDWARD D. PRIEST, OF SCHENECTADY, NEW YORK, ASSIGNOR TO THE GENERAL ELECTRIC COMPANY, A CORPORATION OF NEW YORK.

MEANS FOR INSULATING ELECTRICAL APPARATUS.

SPECIFICATION forming part of Reissued Letters Patent No. 12,243, dated July 19, 1904.

Original No. 648,052, dated April 24, 1900. Original application for reissue filed May 15, 1901, Serial No. 60,400. Divided and this application for reissue filed February 20, 1903. Serial No. 144,240½.

DIVISION B.

*To all whom it may concern:*

Be it known that I, EDWARD D. PRIEST, a citizen of the United States, residing at Schenectady, county of Schenectady, State of New York, have invented certain new and useful Improvements in Means for Insulating Electrical Apparatus, of which the following is a specification.

The present application is a division of my reissue application, Serial No. 60,400, filed May 15, 1901; and the invention hereof relates to means for supporting and insulating conducting members of electrical apparatus.

One embodiment of my invention is illustrated in the accompanying drawing, which shows in perspective a brush-holder with its insulating-support in section.

The brush-holder is made in two parts C and C′. The former comprises suitable receptacles and guides for the brushes, while the latter is in the nature of a support and is bolted to the field-frame or other fixed portion of the machine.

The brushes D are retangular in shape and are mounted in correspondingly-shaped guides E. As shown, a number of brushes are provided, each capable of independent movement. The brushes are forced against the commutator by spring-pressed arms F. The main pressure on the brushes against the commutator is obtained from coiled springs G; but in order to compensate for minor irregularities the end of each arm is itself a spring and is provided on the under side where it engages with the brush with a curved wearing-strip F′. The outer end of the arm is extended to form a hook $F^2$, whereby the arm may be raised to permit the insertion of a new brush or the examination of an old one. The spring G is secured at its rear end to the casting H, which is mounted on the shaft I, and mounted directly over it, and also secured to the casting H is a plate M for limiting its outward movement. Each brush-arm casting is provided with a hub having a number of radially-extending portions H′, around which the spring G is coiled. The castings are retained in place by the shaft I, which extends through the brush-holder from end to end. This shaft is supported at its outer ends by the sides $C^2$ of the brush-boxes, and at intermediate points by the projections J.

Extending outward from the hub of the casting H toward the brush is a hooked arm $H^2$, and engaging with this arm is one end of the coiled spring G, the other end being slightly curved and engaging with the rod K, which extends parallel with and just back of the brushes. The rod K is supported at its outer ends by the sides $C^2$ of the brush-box and at intermediate points by the ears K′. It will be seen that the center of movement of the spring is the same as that of the brush-arm, and that the ends of the springs are secured at points between the brushes and the support for the castings H. This is a very desirable arrangement, as it reduces the pressure on shaft I to a minimum, thereby decreasing the wear on the same, and at the same time provides a construction wherein the pressure on the brush is uniform over a wide range of movement.

In order to increase the conductivity between the parts and at the same time shunt any current around the springs, flexible cables L are employed, which are secured at one end to the holder at points near the brush and at the other end to webs which connect the radial projection H′ on the casting H. As a further precaution against heating, flashing, and the deposition of carbon or other dust the under side of the holder is closed by a plate formed integral with the sides and brush-guides.

For the purpose of adjustment the brush-holder proper is provided with projections N, working in grooves N′, and bolts $N^2$ are employed to clamp the parts together.

Referring now to the support for the holder, O represents a casting having two cup-shaped portions O′, one of which is shown in section, and a socket $O^2$ for receiving a cable for conveying current. Mounted within the cup-shaped portion O′ is a screw-threaded metal plug P, arranged to receive the retaining-bolt. Surrounding this plug is a layer of insulation R, preferably of mica on account of its firmness and insulating qualities, over which is a metal sleeve S. The sleeve is split, so that when assembled it will grip the insulation tightly and will not injure it. The length of the sleeve is approximately the same as the depth of the socket, and when assembled the two are forced together in a hydraulic press. The bottom of the socket is provided with a layer of insulation, as is also the head of the screw-threaded piece P, and in this manner all leakage is prevented. After the above-mentioned parts have been assembled a layer of adhesive tape T is wound thereon, as shown in section, and an insulator U, preferably of refractory material, is slipped over the tape. The tape serves to increase the creepage surface and also as a cushion for the insulator to prevent breakage. The insulator is provided with an internal shoulder which engages with that portion of the tape over the end of the socket and is held in place by the retaining-bolt. The outer surface of the insulator is corrugated, so as to present an extended creeping surface.

What I claim as new, and desire to secure by Letters Patent of the United States, is—

1. The combination of a metallic socket, a plug located therein, a body of insulating material located between the plug and the socket, and an insulator applied endwise over the end of the plug and the socket.

2. The combination of a socket, a screw-threaded plug surrounded by a layer of insulation, a metal sleeve surrounding said insulation and making a driving or forced fit with the socket, and an insulator having a chambered portion surrounding a portion of the plug and the socket.

3. The combination of a socket, a screw-threaded plug mounted therein and surrounded by a sleeve of insulating material and a closely-fitting metal sleeve, a layer of insulating material located between the end of the plug and the bottom of the socket, a winding of tape around the socket and the plug, and an insulator which surrounds the plug and socket and is in direct contact with the tape.

4. The combination of a socket, a plug mounted in said socket and surrounded by a layer of insulating material and a split metal sleeve, the said plug and sleeve being forced into the socket, and a layer of insulating material located between the end of the plug and the bottom of the socket.

5. Means for supporting and insulating electrical apparatus, which comprises a metal portion provided with a cup-shaped opening, and a metal plug which is covered with sheet insulation and driven tightly into said cup-shaped opening so that the metal parts are held from displacement by the frictional resistance between the sheet insulation and their contiguous surfaces.

6. Means for supporting and insulating electrical apparatus, which comprises a metal portion provided with a cylindrical opening, and a metal plug covered with sheet insulation and provided with a yieldable metallic sheath for the insulation which is forced tightly in said opening so that said parts are securely held by the friction between their engaging surfaces.

7. Means for supporting and insulating electrical apparatus, which comprises a metal portion provided with a cup-shaped opening, a metal plug which is covered with insulation, a split metal sleeve over the insulation which fits tightly in said opening, and insulation located between the end of the plug and the bottom of the opening.

8. Means for supporting and insulating electrical apparatus, which comprises a metal portion provided with a cup-shaped opening, a metal plug surrounded by insulating material and driven tightly into said cup-shaped opening, and a separate insulating-ring surrounding the plug outside of the opening.

9. An article of manufacture, comprising a metallic plug having its sides surrounded by sheet insulation, and an elastic, metallic ring surrounding said sheet insulation.

10. The combination of a socket, a screw-threaded plug surrounded by a layer of insulation and a metal sleeve, the said sleeve making a driving or forced fit with the socket, an insulator having a chambered portion surrounding a portion of the plug and the socket, and means for holding the support and the insulator in fixed relation.

In witness whereof I have hereunto set my hand this 19th day of February, 1903.

EDWARD D. PRIEST.

Witnesses:
BENJAMIN B. HULL,
HELEN ORFORD.